April 29, 1952  J. W. SWIFT  2,594,515
TREADLE OPERATED GATE
Filed Oct. 7, 1947  4 Sheets-Sheet 1

Inventor
John W. Swift
By Clarence A. O'Brien
and Harvey B. Jacobson
Attorneys

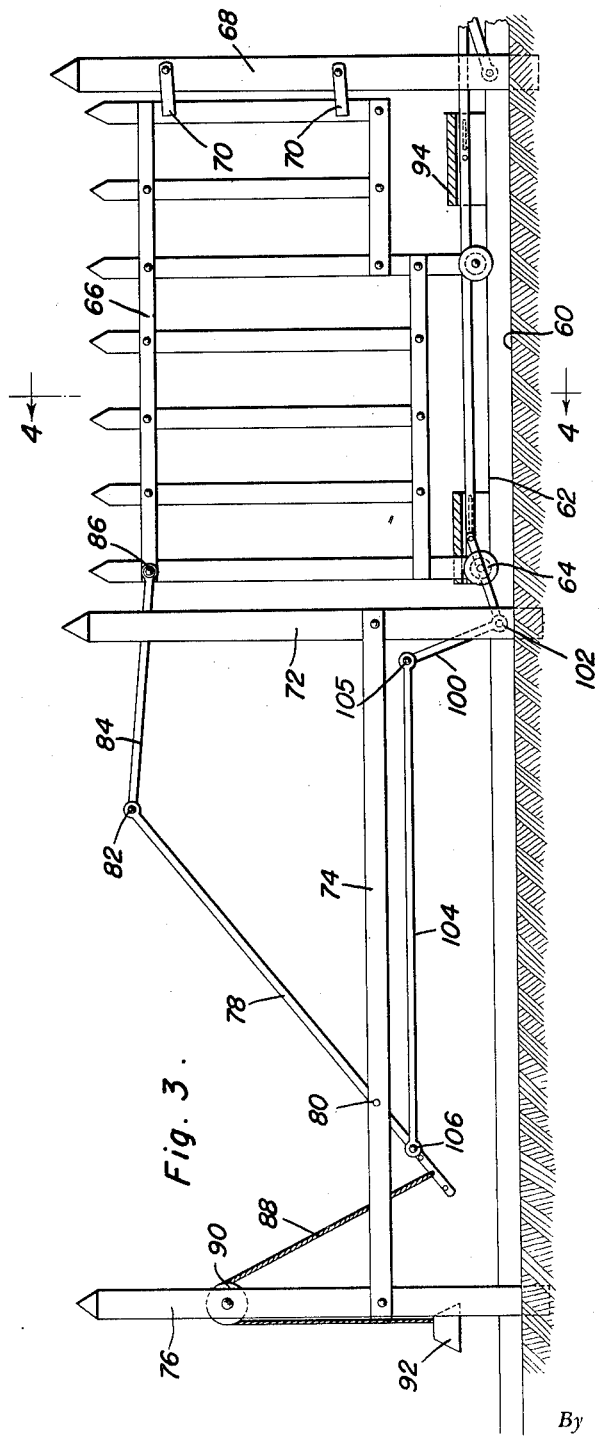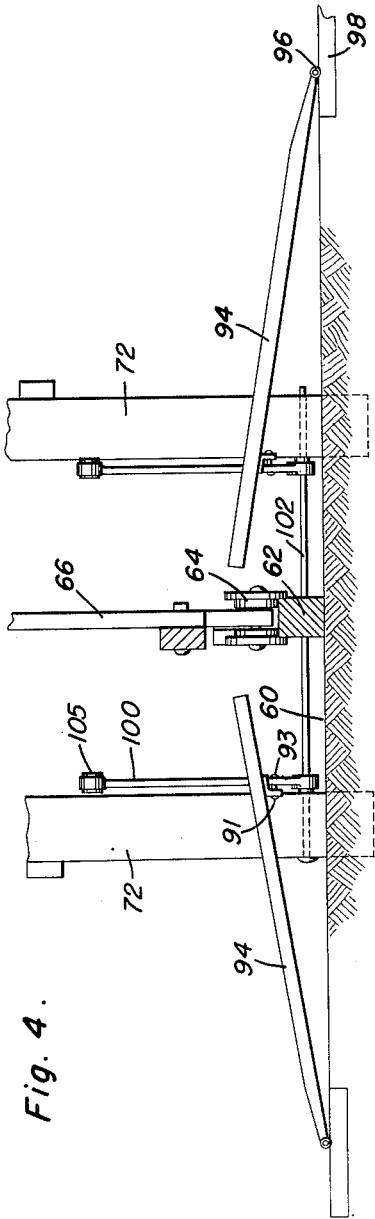

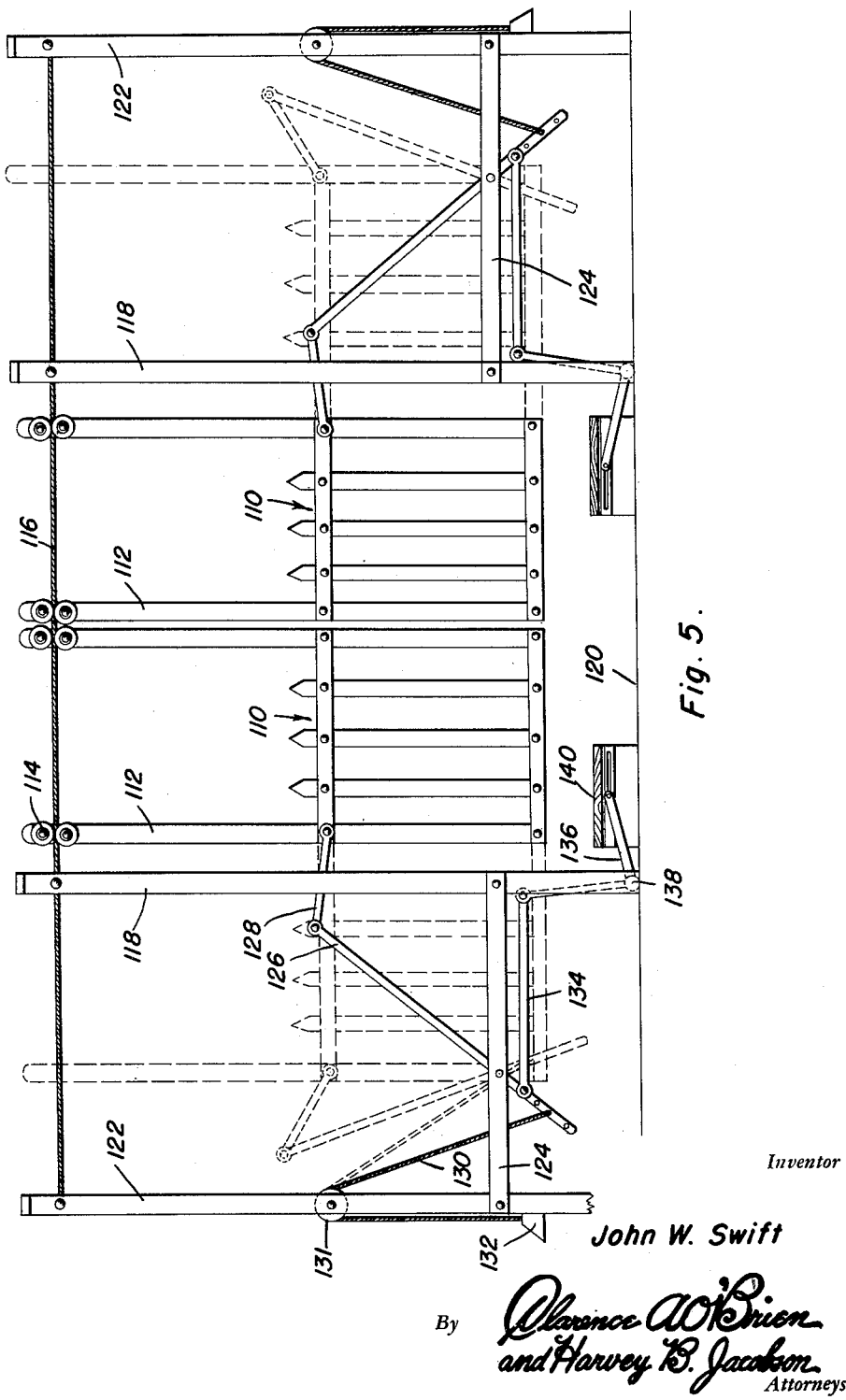

April 29, 1952  J. W. SWIFT  2,594,515
TREADLE OPERATED GATE
Filed Oct. 7, 1947  4 Sheets-Sheet 4
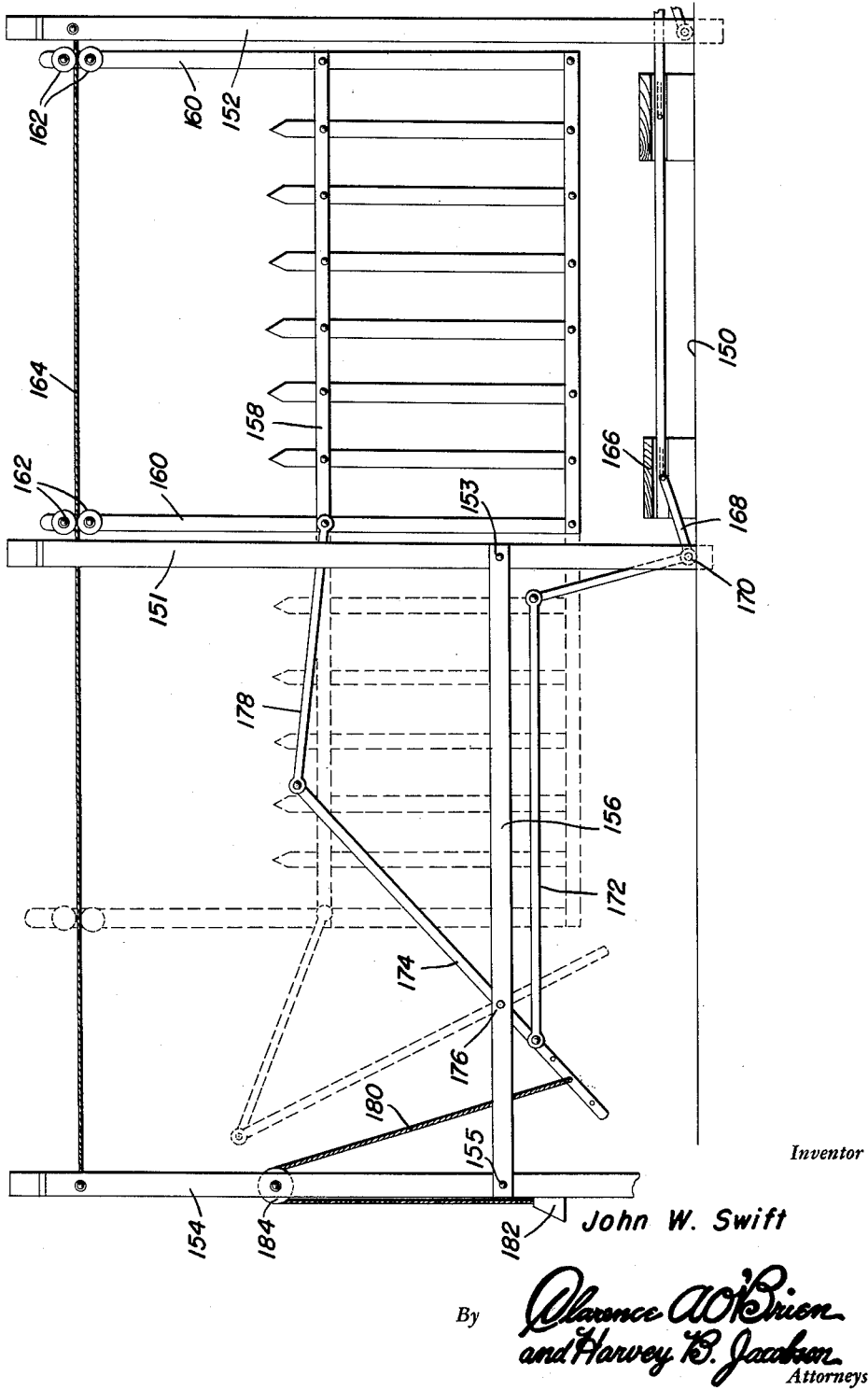
Inventor
John W. Swift
By Clarence A. O'Brien
and Harvey B. Jacobson
Attorneys Patented Apr. 29, 1952

2,594,515

UNITED STATES PATENT OFFICE 2,594,515

TREADLE OPERATED GATE

John W. Swift, Pueblo, Colo., assignor of one-half to John J. Walthour, Pueblo, Colo.

Application October 7, 1947, Serial No. 778,319

5 Claims. (Cl. 39—25)

1

This invention comprises novel and useful improvements in a treadle operated gate and more specifically pertains to a simplified but efficient construction for operating a gate in response to the weight of a vehicle or object passing over an appropriately positioned treadle in the passageway controlled by the gate.

The principal object of this invention is to provide a treadle operated gate having an improved weight operated control means therefor; whereby the gate may be withdrawn from its obstructing position in a passageway.

A further important object of the invention resides in providing a construction as set forth in the preceding objects, accompanied by a counterweight mechanism for biasing the gate into its closed position.

Further important objects of the invention reside in providing novel means for supporting the weight of the gate and relieving the same from the operating or closing mechanism; together with a generally simplified, but highly efficient mechanism for the purposes intended.

These, together with various ancillary objects of the invention, which will later become apparent as the following description proceeds, are attained by this device, preferred embodiments of which have been illustrated by way of example only in the accompanying drawings, wherein:

Figure 3 is a front elevational view of a second embodiment of the invention, with parts in section;

Figure 4 is a vertical transverse sectional detailed view taken substantially upon the plane of the section line 4—4 of Figure 3, the upper portion of the construction being omitted;

Figure 5 is a front elevational view of a third embodiment of the invention, with parts in section, alternative positions of the parts being indicated in dotted lines; and, Figure 6 is a front elevational view of a fourth form of the invention, with parts in section.

Figure 1:
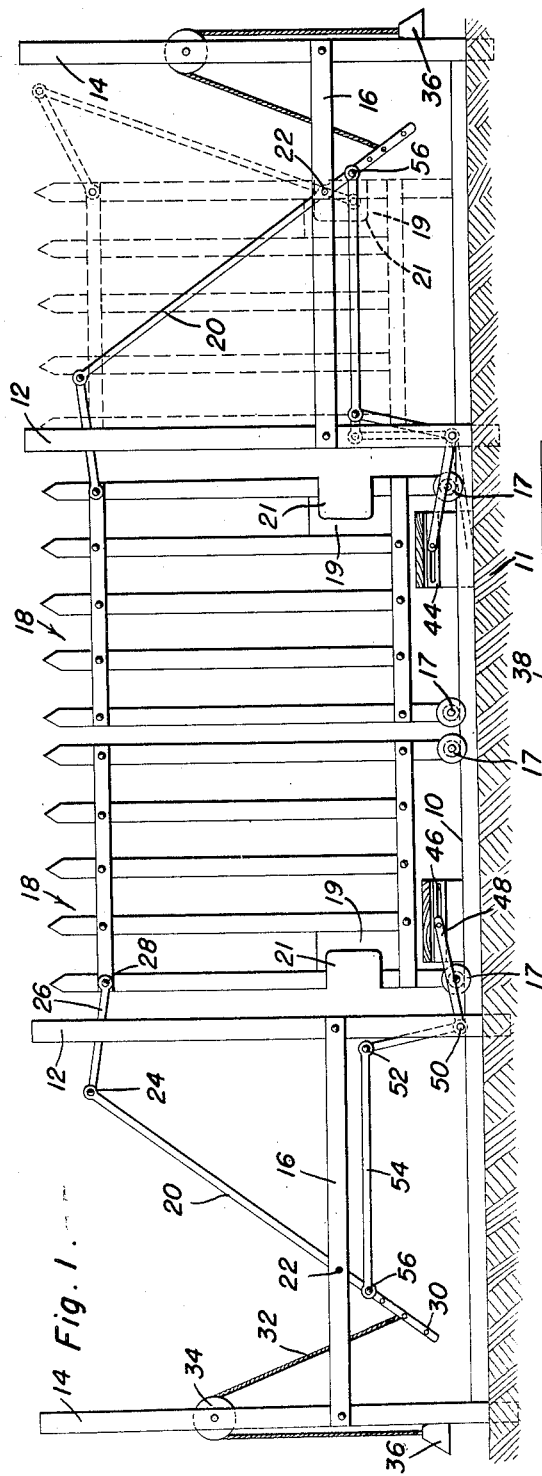
Figure 1 is a front elevational view showing one embodiment of the invention, with parts in section.
Figure 2:
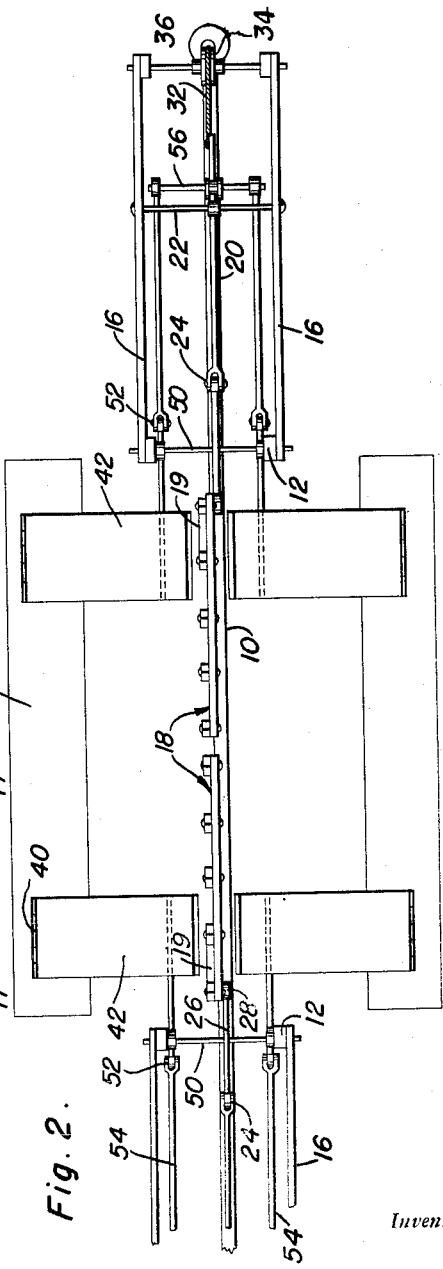
Figure 2 is a top plan view of the embodiment of Figure 1.

Referring now more specifically to the drawings, wherein like numerals indicate similar parts throughout the various views, attention is directed first to the form of the invention shown in Figures 1 and 2, and wherein 10 designates a track and 11 designates the surface of a passageway, such as a road, corridor or other surface over which vehicles or bodies are adapted to pass.

2

If desired, the passageway may be wide enough to accommodate two lanes of traffic, as when used for motor vehicles, or if desired, may be of width to accommodate but a single lane of traffic, it being understood that the principles of the invention are equally applicable to various widths and types of such passageways.

Disposed upon opposite sides of the passageway, are a pair of posts 12, there being a second set of posts 14 displaced laterally from each of the posts 12. A horizontally disposed support member 16 is secured to the posts 12 and 14 to provide a support for a purpose to be later set forth.

A pair of gates 18 of any suitable construction, are provided at their lower extremities with weight supporting means such as rollers 17, bearing upon any suitable supporting surface such as track 10 by means of which the gates may be moved transversely of the passageway toward and from each other from opposite sides of the passageway. As shown in the right-hand of Figure 1 in dotted lines, one of the two gates is shown in its retracted position, to thereby permit unobstructed passage through the passageway.

An operating mechanism is provided for opening and closing each of the gates, this mechanism consisting of a lever 20 which is fulcrumed as at 22 intermediate the ends of the lever to the support member 16 intermediate its ends, this lever being pivotally connected at its upper extremity as at 24, by means of a connecting link 26 and pivot 28, with an appropriate portion of the gate section 18. As shown in Figure 1, the end of the gates 18 may be provided with a block 19 notched at 21 to clear the pin 22 in the open position of the gates, as shown in dotted lines. The lower end of the lever 20 extends below the support 16 and is provided with a plurality of apertures 30 which may be selectively engaged by one end of a flexible connector 32 of the type including a cable and chain, which is entrained over a pulley 34 carried by the post 14, and has its other extremity provided with a counterweight 36. As will be seen, influence of the counterweight 36 is such as to bias the lever 20 in such a direction as to urge the gate section 18 into its closed position. Obviously, the weight 36 will be of sufficient magnitude to effect the desired purpose.

As will be noted from Figures 1 and 2, the two gate sections 18 are provided with similar operating mechanism for opening and closing the gates.

Upon each side of the gate, and preferably imbedded in the surface of the passageway is an anchor plate 38 to which is hingedly connected as at 40, a pair of treadle members 42. As shown in Figure 1, the remote end of the treadle members 42 from the hinge 40, is provided with a depending flange 44 transversely slotted as at 46, to slidingly receive by any suitable fastening connection, one end of a bell crank 48, pivoted as at 50 to the post 12, and having its other end pivoted as at 52 to a connecting rod or link 54 whose outer extremity is pivoted as at 56 selectively in one of the apertures 30 of the lever 20.

The operation of the device as disclosed will now be readily understood. When a treadle 42 is depressed as by the wheel of a vehicle, or the foot of a person or animal pressing thereon, the bell crank connected thereto is rotated, to thereby draw the connecting link 54 and the lower extremity of the lever 20 inwardly towards the passageway, whereby the upper end of the lever and the gate section 18 are urged outwardly and away from the passageway, thereby opening that portion of the passageway controlled by the appropriate gate section.

As shown in Figure 2, the pivot pin 50 is provided with a pair of bell cranks, each connected to a treadle on an opposite side of the gate 18, and each connected by a pair of operating rods 54, to the lever 20, this latter connection including as shown in the right hand of Figure 2, a transversely extending pivot pin 56, which engages the lever 20.

It will be noted that the weight of the gate in this embodiment of the invention is supported by the rollers 17, whereby the operating mechanism imparts only the opening and closing forces to the gate. It will be further noted that a single operating connection is provided which is engaged by both the opening and closing means, thus simplifying the construction of the device.

As will be evident, the treadles 42 upon one side of the gate may be so spaced as to be engaged by the two wheels of an automotive vehicle, when the device is applied in an environment just wide enough to accommodate a single lane of vehicular traffic, whereby both sections of the gate may be simultaneously opened. Alternatively, an animal or person may step upon one of the treadles 42, and thereby open just one of the gate sections. As will be apparent, each section is provided with an operating means which may be actuated from either side of the gate while a single closing means is provided for each section.

Attention is next directed to the embodiment of Figures 3 and 4, wherein a slightly modified form of gate is provided having a single section which entirely closes a passageway or a predetermined portion thereof, and whereby the entire operating means for the gate is disposed adjacent one end of the gate and operated by treadles in the passageway, thereby permitting a more compact arrangement which may be useful in certain environments.

In this embodiment, the surface of a passageway 60 is preferably provided with a transversely disposed rail or track 62 which may be flush with the surface 60, or alternatively and as shown in Figures 3 and 4, may be raised thereabove for the purpose of guiding and receiving a pair of supporting rollers 64 secured to the lower portion of a gate section 66.

A gate post 68 is provided at one side of the passageway 60, this post being equipped with keepers 70 for receiving the end of the gate section. At the other side of the passageway, is provided a post 72 which is connected by horizontally disposed reinforcing or support members 74 with a second post 76.

As in the preceding embodiment, an operating mechanism is provided including a lever 78 pivoted as at 80 to the support members 74, and connected as at 82 to an operating link 84 which is fastened as at 86 to the gate section 66.

At its lower end, the lever is connected in the same manner as that set forth in the preceding embodiment, by means of a cable or chain 88, passing over a pulley 90 carried by the post 76, with a counterweight 92.

One or more operating treadles 94, hinged as at 96 to a bed plate 98, are provided in the surface of the passageway 60, these treadles being connected by a bracket 91 and pin 93 to the bell crank 100, pivoted as at 102 to the posts 72, and attached with the end of the operating lever 78 by a connecting rod 104, having at opposite ends connections 105 and 106 with the bell crank 100 and operating lever 78, respectively.

Reference is now made to the third form of the invention illustrated in Figure 5, and which follows generally upon the same principles as that set forth for the two preceding embodiments. This form, however, differs from that shown in Figures 1 and 2 chiefly in that the gate sections are supported not by rollers from the ground, but are hung by rollers from a suspension cable. In this form, a pair of gate sections 110 are hung by means of hanger arms 112 and guide or support rollers 114 from a suspension cable 116, which is suitably attached to gate posts 118 on opposite sides of a passageway 120 and connected to further posts 122 as illustrated.

The posts 118 and 122 are connected by horizontal support or reinforcing members 124 to which members are pivoted operating levers, 126 having gate engaging links 128 and connected by cables 130 with counterweights 132, the cables 130 passing over pulleys 131. The levers are operated to open the gate by means of connecting rods 134 pivotally connected to bell cranks 136 which in turn are pivoted as at 138 to the posts 118, these bell cranks engaging treadle members 140 in the same manner set forth in connection with Figure 1. The operation of this form of the invention is identical with that set forth in connection with Figures 1 and 2, except that the rollers supporting the gates have been omitted and the gates have been hung by hangers from a suspension cable.

Referring now to the embodiment of Figure 6, it will be seen that the latter is operated similar to the embodiment of Figures 3 and 4, except that the suspension principle of Figure 5, has been applied thereto. For this purpose, a passageway 150 has a pair of gate posts 151 and 152 on opposite sides thereof, while a further post 154 is provided on one side, connected to a post 151 by means of the horizontal support member 156, having end connections with the post 151 at 153 and the post 154 at 155. A gate section 158 is provided with arms 160 and support rollers 162 by means of which the gate may be shifted along a horizontally disposed suspension cable 164 suitably anchored to the posts 152 and 154. Treadle members 166 connected to the bell cranks 168 in the same manner set forth in Figure 1 are pivoted as at 170 to one of the gate posts 152 and operate by means of a connecting rod 172, a lever 174 pivoted at 176 to the support member 156, and attached by a link 178 to the gate section 158. As in each of the preceding embodiments, a flexible connector 180 of the type including a cable and chain is attached at one end to the operating lever 174, and at the other end is provided with a counterweight 182, the cable passing over pulleys 184 carried by the posts 154.

The operation of this form of the invention is identical with that set forth for the embodiment of Figures 3 and 4, with the exception of the suspension cable supporting the gate, instead of the rollers and track shown in the modification of Figures 3 and 4.

From the foregoing, the manner of operating and constructing the device will be readily understood, together with its many advantages of simplified construction, dependable operation, easy actuation and extreme adaptableness to various types of passageways such as highways, railroad crossings, farmyard use, sidewalks and other uses.

Since numerous modifications falling within the spirit of the invention will be readily understood and apparent to those skilled in the art after a consideration of the foregoing specification and attached drawings, it is not intended to limit the invention to the exact construction shown and described, but all suitable modifications and equivalents may be resorted to falling within the scope of the appended claims.

Having described the invention what is claimed as new is:

1. A sliding crossing gate comprising a support means on opposite sides of a passageway, a gate section for each support means movable transverse said passageway between said support means, a pair of treadles disposed in said passageway and spaced laterally of the passageway from each other, an actuating lever pivoted to each support means for controlling each gate section, a connection between each lever and one of said gate sections for independently moving said sections, a further connection between each lever and the adjacent treadle for independently operating each lever.

2. The combination of claim 1 including a counter-weight mechanism for each gate section, said mechanisms being mounted upon said support means, each mechanism being adjustably connected to one of said actuating levers.

3. The combination of claim 1 wherein said levers, support means, gate sections and first mentioned connections are disposed in alignment transverse said passageway.

4. The combination of claim 1 wherein each treadle has a depending flange with a slot therein, said further connection including a bellcrank having one end slidably connected to said slot and having its other end connected to said actuating lever.

5. The combination of claim 4 wherein each bellcrank is mounted upon a support means.

JOHN W. SWIFT.

REFERENCES CITED

The following references are of record in the file of this patent:

UNITED STATES PATENTS

| Number | Name | Date |
| --- | --- | --- |
| 84,512 | Seymour | Dec. 1, 1868 |
| 179,617 | Shugart | July 4, 1876 |
| 778,324 | Miesse et al. | Dec. 27, 1904 |
| 790,890 | Graeber | May 30, 1905 |
| 851,020 | Morris | Apr. 23, 1907 |
| 1,895,595 | Strandt | Jan. 31, 1933 |
| 2,125,183 | Kirkpatrick | July 26, 1938 |